United States Patent
Fuchs (10) Patent No.: US 7,654,339 B2
(45) Date of Patent: Feb. 2, 2010

(54) IMPACT DRILL WITH SWIVEL DEVICE

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 11/946,334

(22) Filed: Nov. 28, 2007

(65) Prior Publication Data

US 2008/0142237 A1    Jun. 19, 2008

(30) Foreign Application Priority Data

Dec. 14, 2006    (DE)    .................    10 2006 059 633

(51) Int. Cl.
*B25D 15/02*    (2006.01)
(52) U.S. Cl. ................... 173/48; 173/47; 173/128; 173/130; 81/57.26
(58) Field of Classification Search ............... 173/48, 173/47, 128, 130; 81/57.26
See application file for complete search history.

(56) References Cited

U.S. PATENT DOCUMENTS

| | | | | |
|---|---|---|---|---|
| 4,487,272 A * | 12/1984 | Bleicher et al. | ............... | 173/48 |
| 5,251,706 A * | 10/1993 | Evans | ........................... | 173/29 |
| 5,784,934 A | 7/1998 | Izumisawa | | |
| 6,202,763 B1 * | 3/2001 | Gude et al. | .................. | 175/135 |
| 6,761,507 B2 * | 7/2004 | Wentworth et al. | ...... | 405/184.3 |
| 6,923,094 B1 * | 8/2005 | Marquardt | .................. | 81/57.3 |
| 7,080,578 B2 * | 7/2006 | Izumisawa | .................. | 81/57.39 |
| 7,400,106 B2 * | 7/2008 | DeCicco et al. | ............. | 318/434 |
| 7,487,844 B2 * | 2/2009 | DeCicco et al. | ................ | 173/2 |
| 2003/0094293 A1 * | 5/2003 | Fuchs | ......................... | 173/171 |
| 2007/0084616 A1 * | 4/2007 | Lam et al. | .................... | 173/217 |
| 2007/0144310 A1 * | 6/2007 | Pozgay et al. | ............... | 81/57.26 |
| 2007/0144752 A1 * | 6/2007 | Pozgay et al. | ............... | 173/216 |
| 2008/0087449 A1 * | 4/2008 | Lam et al. | .................... | 173/217 |

FOREIGN PATENT DOCUMENTS

| | | |
|---|---|---|
| GB | 2 126 515 | 3/1984 |
| GB | 2 383 006 | 6/2003 |
| JP | 2006-181664 | 7/2006 |

* cited by examiner

*Primary Examiner*—Brian D Nash
(74) *Attorney, Agent, or Firm*—Michael J. Striker (57) ABSTRACT

An impact drill that includes a drive motor located in a motor housing, an impact mechanism, and a tool fitting. The tool fitting and the impact mechanism are components of a swivel device that is located such that the swivel device may swivel relative to the motor housing.

8 Claims, 8 Drawing Sheets

IMPACT DRILL WITH SWIVEL DEVICE

CROSS-REFERENCE TO A RELATED APPLICATION

The invention described and claimed hereinbelow is also described in German Patent Application DE 10 2006 059 633.1 filed on Dec. 14, 2006. This German Patent Application, whose subject matter is incorporated here by reference, provides the basis for a claim of priority of invention under 35 U.S.C. 119(a)-(d).

BACKGROUND OF THE INVENTION

The present invention relates to an impact drill.

Drills without an impact function are known from the related art, which include a pistol handle, central handle or a spade handle and have a short overall length. Devices of this type are of only limited use for working in narrow spaces, however. Angle drills are therefore used for applications of this type. With known angle drills, the motor—which is usually bar-shaped—and the angled head—which is permanently positioned at a 90° angle thereto—enable a compact design to realized and for the reaction torque of the motor to be suitably absorbed.

In addition, angled impact drilling heads for installation on drills and percussion hammers are known. The angled impact drilling head transfers the impact force to the angled tool.

Compared with drills and percussion hammers, impact drills are characterized by the fact that the magnitude of the impact impulse depends on the magnitude of the contact pressure being applied by the operator. Angled impact drilling heads for use with impact drills of this type are not known. If the angled impact drilling heads known for use with drills and percussion hammers would be used with impact drills, this would markedly reduce the impact drilling output, which was already relatively low to begin with.

SUMMARY OF THE INVENTION

The object of the present invention, therefore, is to provide an impact drill, with which it is possible to work around corners with sufficient impact performance.

In keeping with these objects and with others which will become apparent hereinafter, one feature of the present invention resides, briefly stated, in an impact drill, comprising a housing; a drive motor located in said housing; an impact mechanism; a tool; and a tool fitting, said tool fitting and said impact mechanism being configured as components of a swivel device which is swivelable relative to said motor housing.

The present invention is based on the idea of integrating a swivel device in an impact drill, which is located such that it may be swiveled relative to the motor housing of the impact drill, the swivel device containing a tool fitting (e.g., a chuck) for securing tools such as drill bits, and containing the impact mechanism for generating the impact impulses. The location of the impact mechanism in the swivel device—which may be positioned at a right angle—has the advantage that the impact impulses need not be transferred by the motor housing to the tool, thereby making it possible to realize a relatively simple design overall. Moreover, the impact impulses may be transferred to the tool with full output, since the impact impulses need not be redirected. By locating the impact mechanism in the swivel device, it is also possible to realize an extremely compact design.

Since the impact mechanism is accommodated in a swivel device that is integrated in the impact drill, the laborious steps of installing and removing a separate angled impact drilling head is eliminated, thereby making it possible to use the impact drill immediately. The inventive impact drill with the swivelably mounted impact mechanism may be realized in all traditional designs with a pistol handle, a central handle, or a spade handle. By separating the motor housing and the impact mechanism, it is possible to use drive motors with any level of output and large diameters, to a certain extent, without this having a negative effect on the small width across corners, which may be realized. As drive motors, it is possible to use mains-operated electric motors, e.g., universal motors, electric motors powered by storage batteries, compressed air motors, or hydraulic motors.

In an embodiment of the present invention, it is advantageously provided that the swivel device may be fixed in position relative to the motor housing in specified, discrete angular positions or in any, freely selectable angular position. Appropriate, detachable snap-in and/or clamping mechanisms may be provided for this purpose.

It is particularly advantageous when a transmission shaft of the impact drill simultaneously serves as the swivel axis of the swivel device. The transmission shaft is preferably located perpendicularly to the longitudinal axis of the tool fitting. With a design of this type, an additional swivel axis may be eliminated.

According to a preferred embodiment of the present invention, the impact mechanism—which may be swiveled together with the tool fitting—is designed as an index impact mechanism. The index impact mechanism is preferably composed of two disks, which glide across each other under contact pressure, with a first snap-in disk being fixed in position on a tool shaft, which is supported in the swivel device, and the corresponding, second snap-in disk being fixed in position in the swivel device. Both snap-in disks are preferably provided with abutting gradations—which include slants that extend in the circumferential direction—on the facing end faces in a manner known per se, so that, when the first snap-in disk is rotated, the tool shaft is moved back-and-forth repeatedly in the axial direction. With an index impact mechanism of this type, the impact performance depends on the amount of contact pressure applied by the operator.

In an embodiment of the present invention, it is advantageously provided that the impact drill may be switched between a drill-only mode and a combination impact-drilling mode. It is advantageous to design the transmission of the impact drill such that the impact drill may be operated—within a certain working range (swivel range) of the swivel device—at any angle, in the drill-only mode and in the combination impact-drilling mode.

To prevent or at least limit an axial displacement of the tool shaft in the swivel device, an axial bearing is provided in a refinement of the present invention for supporting the tool shaft in the axial direction, against the drilling direction. Via an axial bearing of this type, the two diametrically opposed snap-in disks of the impact-drilling mechanism are prevented from coming to rest against each other in the drill-only mode.

It is advantageous when the axial bearing may be displaced from its support position—which it assumes in the drill-only mode—preferably in the circumferential direction into a "park" position, in which axial displaceability of the tool shaft is ensured, so that the impact drill may be used in the combination impact-drilling mode, in particular by the fact that the diametrically opposed snap-in disks are pressed against each other when force is applied by the impact drill in the impact drilling direction. When the tool shaft rotates, impact impulses therefore result in the axial direction on the tool shaft and, therefore, on the tool fitting with the tool installed therein.

One possibility for realizing the adjustable axial bearing described is for the axial bearing to include a bearing, against which the tool shaft bears in the axial direction in the drill-only mode. The bearing is retained in a bearing sleeve, which encloses the swivel axis, at least in sections, the swivel axis preferably being formed by a transmission axis. When the bearing sleeve, together with the bearing, is rotated in the circumferential direction around the swivel axis, the bearing is disengaged from the tool shaft, thereby providing the tool shaft with play in the axial direction. The bearing sleeve is preferably equipped with at least two circumferential sections having different outer diameters. In the combination impact-drilling mode, the circumferential section with the smaller outer diameter is located behind the tool shaft in the axial direction, to ensure sufficient axial play for the tool shaft.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Identical components and components with the same functionality are labelled with the same reference numerals in the figures.

The figures show an impact drill 1, with a drive motor 3 located in a motor housing 2. Impact drill 1 includes a swivel device 4—which may be swiveled relative to motor housing 2—with a tool fitting 5 and an impact mechanism 6 designed as an index impact mechanism.

A first handle 7 is provided on motor housing 2, and includes an operating switch 8 for turning drive motor 3—which is designed as a universal motor—on and off. Impact drill 1 also includes a second handle 9, which is detachably connected to swivel device 4. A clamping device with an adjusting screw 10 is provided for securing and releasing second handle 9.

Figure 1:
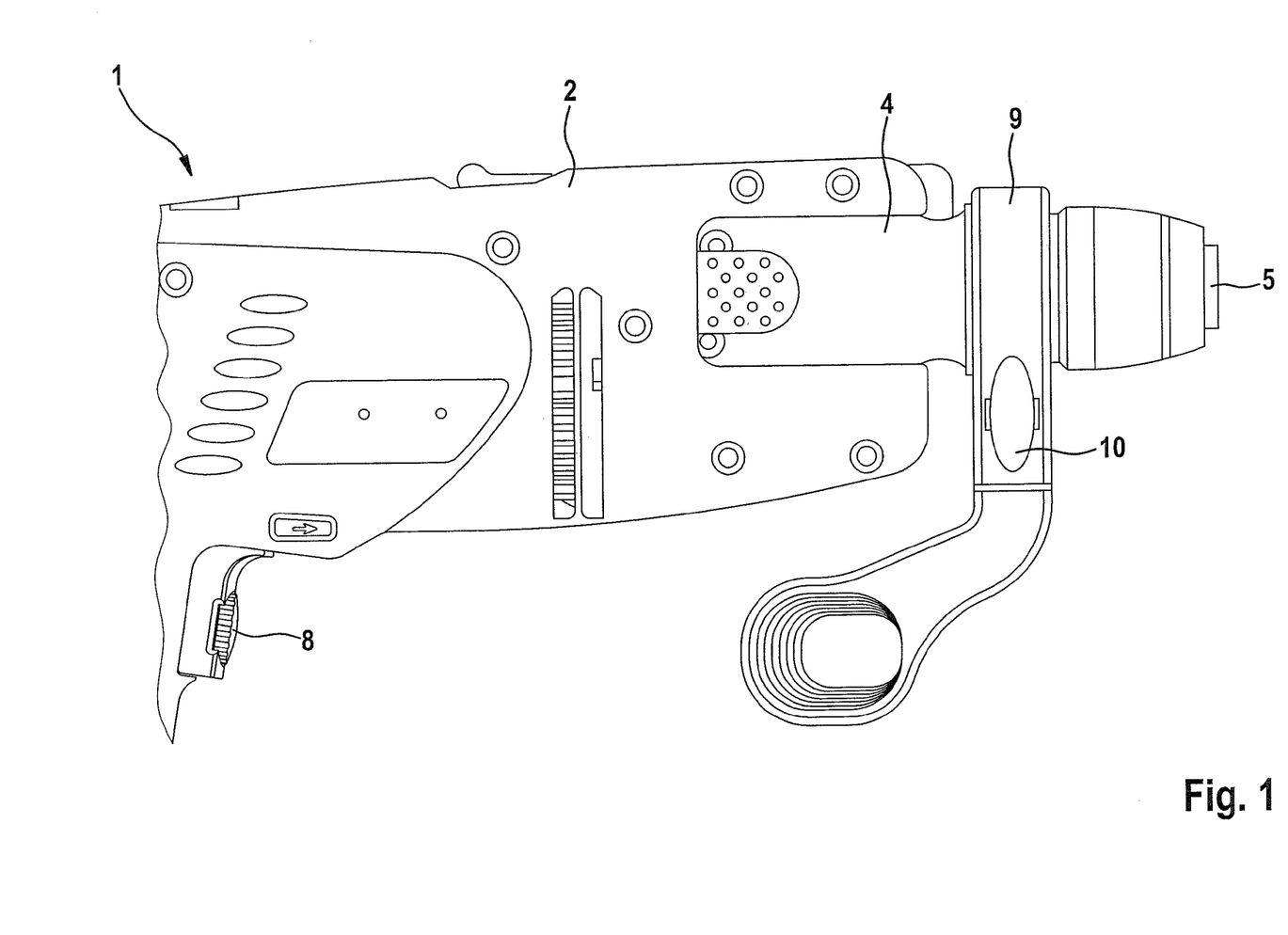
FIG. 1: A side view of an impact drill with an integrated swivel device.
Figure 2:
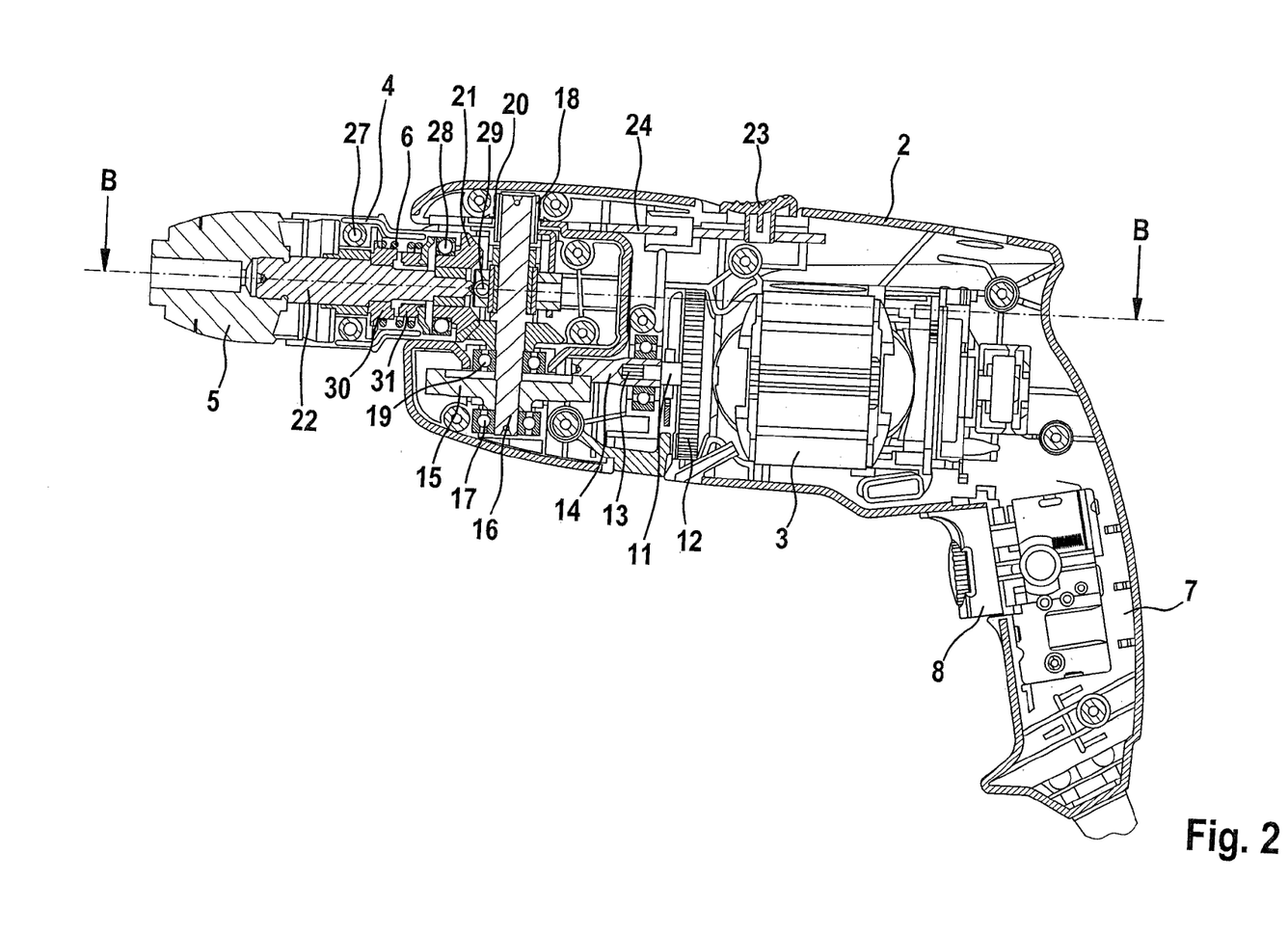
FIG. 2: A depiction of the impact drill, in a longitudinal sectional view, set for the drill-only mode.

Swivel device 4 may be adjusted from the straight position shown in FIG. 1 by 90° in any swivel direction 4, thereby resulting in a working range of approximately 180°.

The motor torque is transferred by motor shaft 11, on which a fan wheel 12 is non-rotatably mounted to cool drive motor 3, via an inner tooth system 13 to a drive pinion 14. Drive pinion 14 transfers the torque to a large bevel gear 15, which is non-rotatably mounted on a transmission shaft 16. Transmission shaft 16 is positioned at a 90° angle to motor shaft 11 and drive pinion 14. Transmission shaft 16 is rotatably supported in motor housing 2 via a fixed bearing 17—which is designed as a ball bearing—and via a sliding bearing 18 on the diametrically opposed side. Sliding bearing 18 also performs a bearing function for swivel device 4, which bears against the outer diameter of sliding bearing 18. The swivel bearing is also supported via ball bearing 19 such that it may swivel relative to transmission shaft 16. Transmission shaft 16 a simultaneously serves as the swivel axis for swivel device 4.

A further bevel gear 20, with a smaller diameter, is non-rotatably mounted on transmission shaft 16 at a distance from bevel gear 15. Bevel gear 20, in turn, drives bevel gear 21, which is positioned at a 90° angle thereto, and which is meshed with a tool shaft 22 in a manner such that a torque may be transferred in the circumferential direction to tool shaft 22, and tool shaft 22 may be adjusted simultaneously in the axial direction relative to bevel gear 21. The tool shaft is screwed together fixedly with tool fitting 5 (chuck), thereby ensuring that a rotational motion and a motion in the axial direction of tool shaft 22 are transferred directly to tool fitting 5 and the not-shown tool, which may be fixed in position in tool fitting 5.

Figure 8:
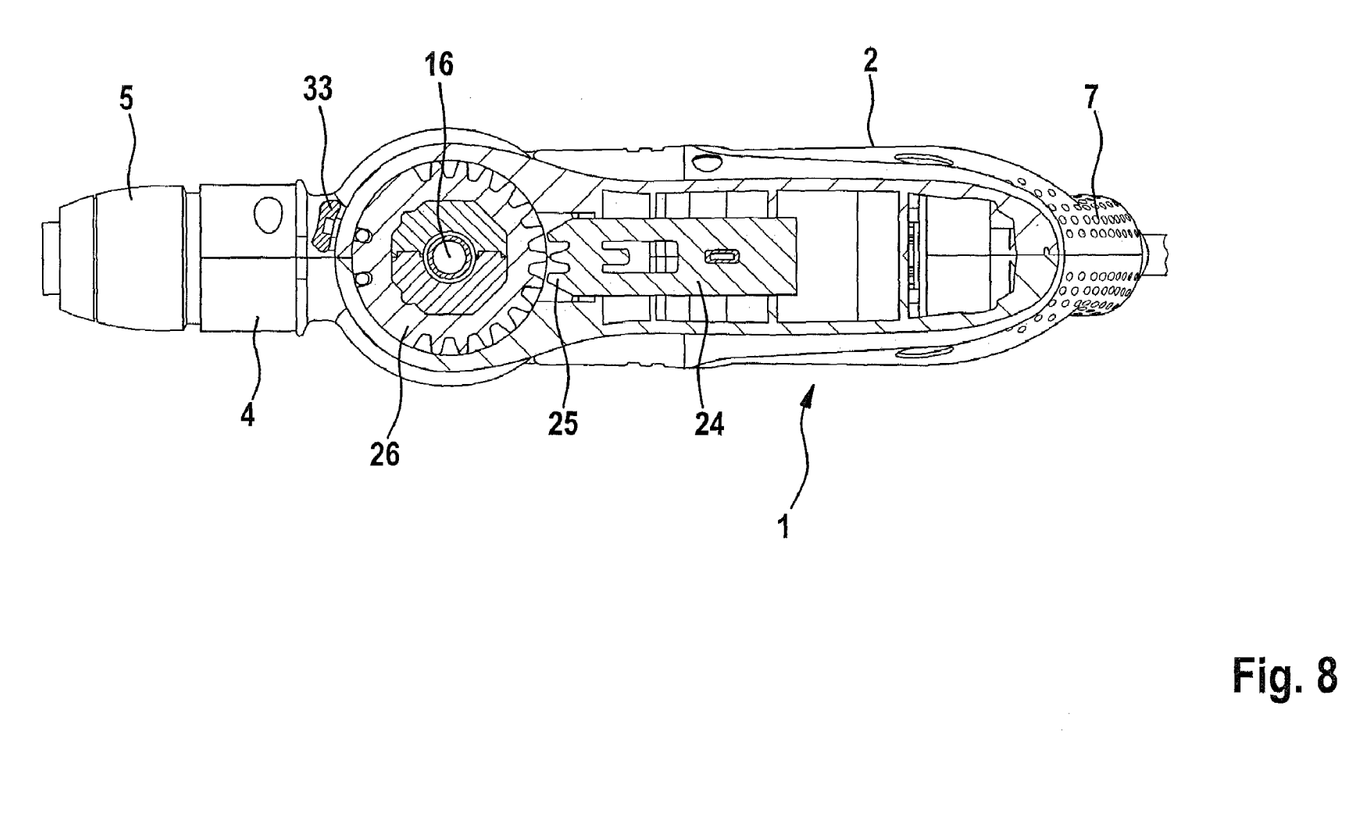
FIG. 8: A sectional view of the impact drill along line of intersection D-D according to FIG. 3 set for the combination impact-drilling mode.

A switch lever 23 that is located on the top of motor housing 2 and is fixedly connected with a transmission linkage 24 is provided in order to fix the swivel device in discrete angular settings. As shown in FIG. 8 in particular, transmission linkage 24 is provided with toothing 25 on its front end, which may be non-rotatably engaged with gearwheel 26, which is connected with swivel device 4. In the retracted position of transmission linkage 24 shown in FIG. 8, swivel device 4 may be swiveled via transmission shaft 16.

Tool shaft 22 is rotatably supported in swivel device 4 via radial bearing 27 and via radial bearing 28—which is located at a distance from radial bearing 27. Radial bearing 28 simultaneously braces bevel gear 21—which encloses tool shaft 22—in the radial direction.

Figure 5:
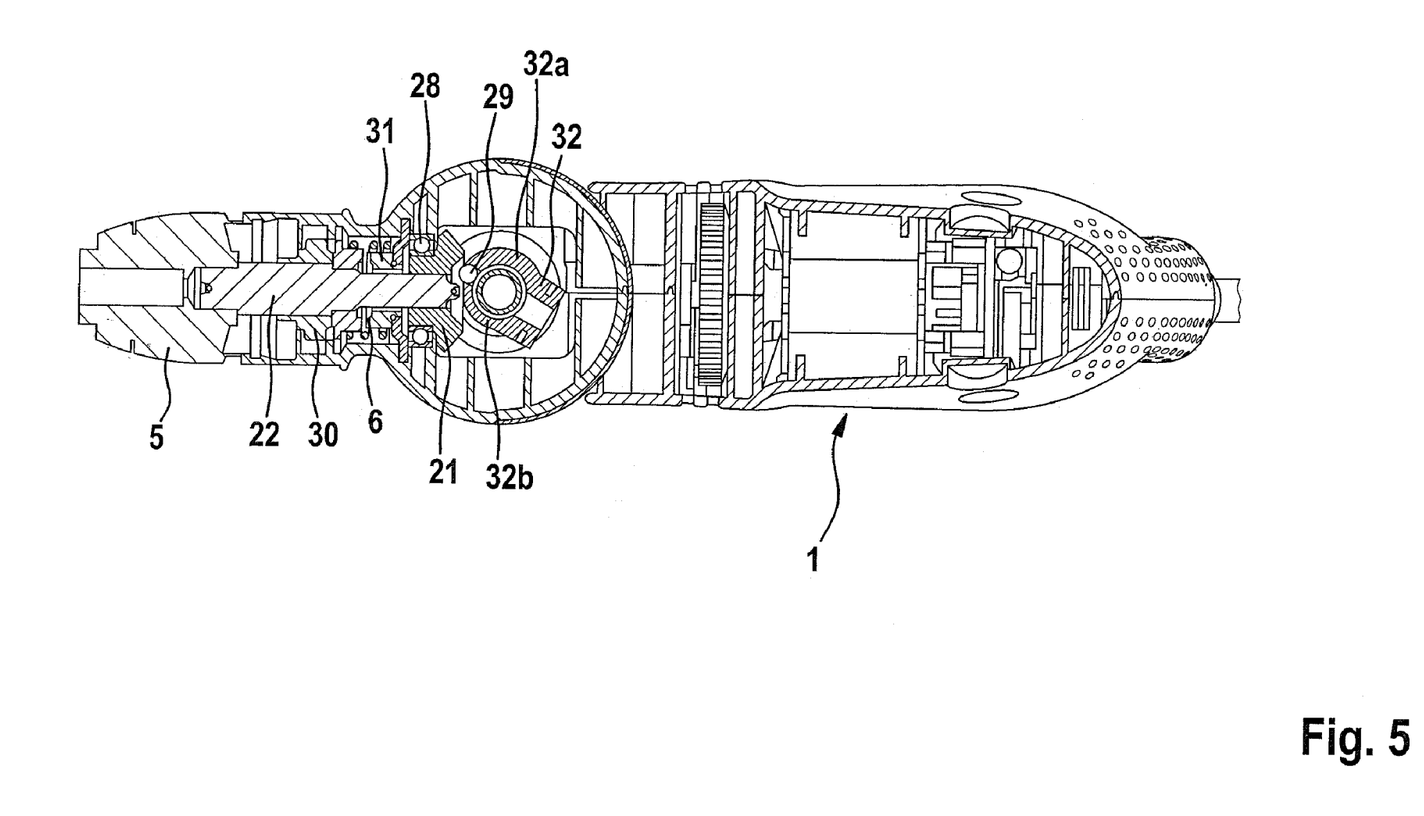
FIG. 5: A sectional view of the impact drill along line of intersection A-A according to FIG. 3, set for the combination impact-drilling mode.
Figure 6:
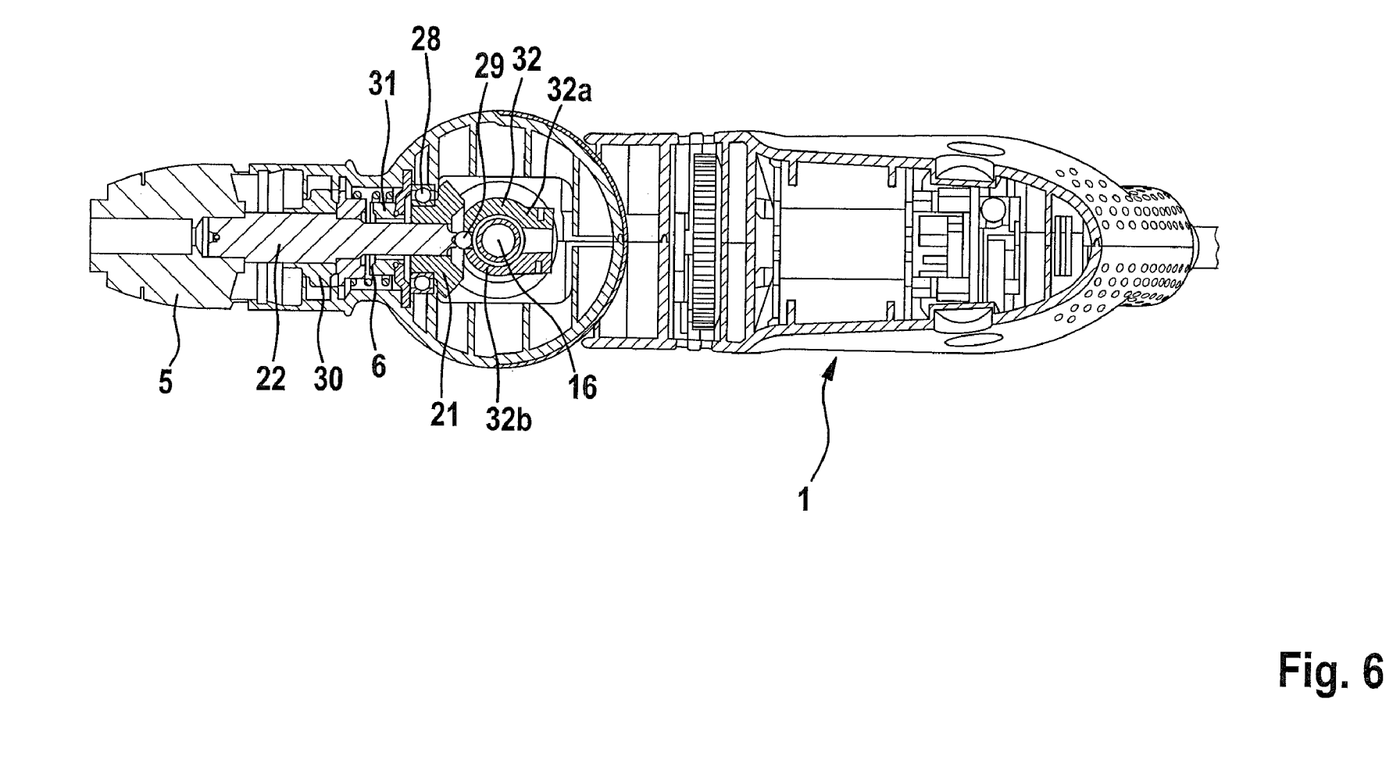
FIG. 6: A sectional view of the impact drill along line of intersection B-B according to FIG. 2, set for the drill-only mode.
Figure 7:
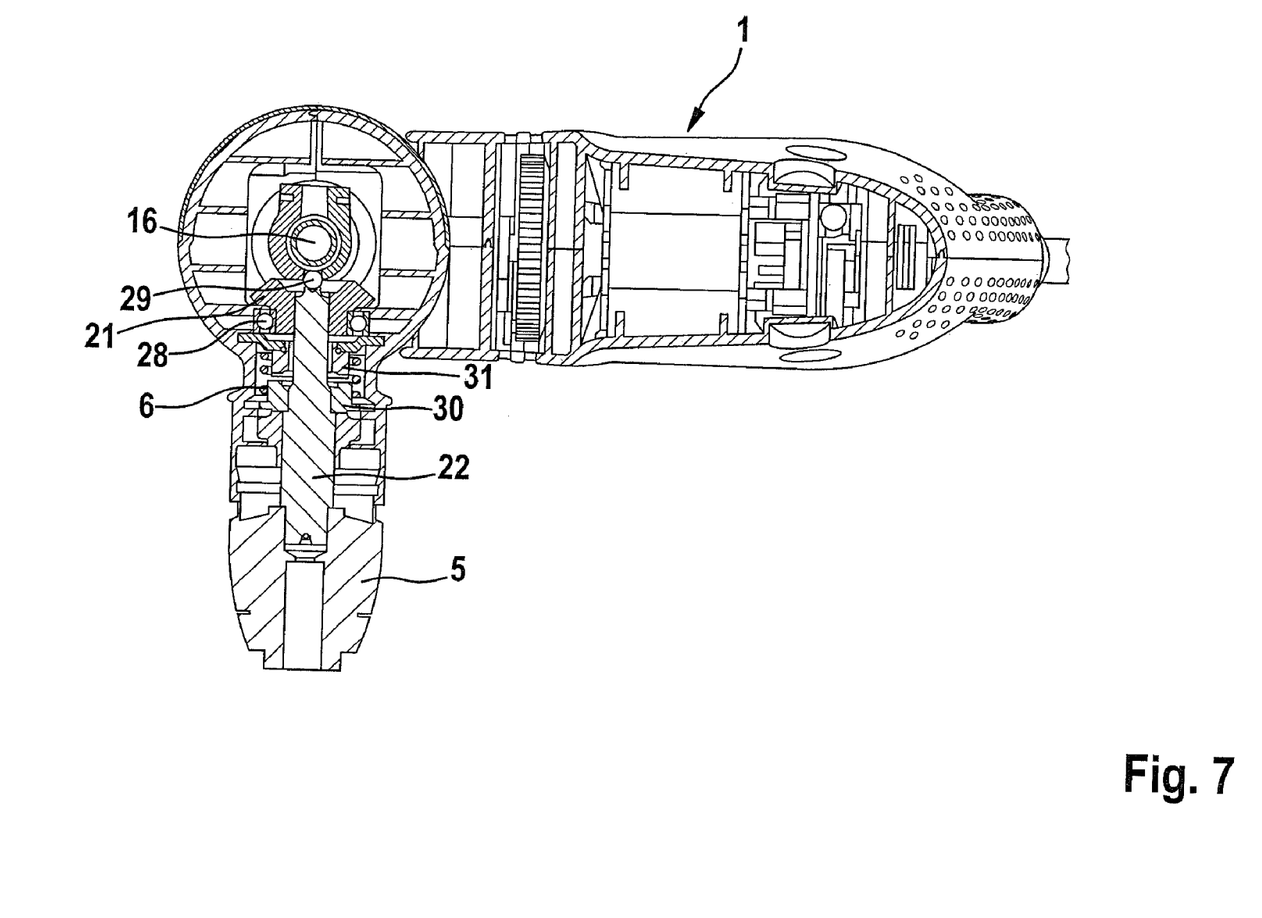
FIG. 7: A sectional view of the impact drill along line of intersection C-C according to FIG. 4, set for the drill-only mode.

In FIGS. 2, 4, 6, and 7, impact drill 1 is set such that it may be operated in the drill-only mode, i.e., without any impact impulses. To this end, tool shaft 22 bears in the axial direction against an axial bearing 29, which is designed as a bearing. Axial bearing 29 prevents snap-in disks 30, 31—which will be described in greater detail below—from coming to rest against each other, via their end faces, in the axial direction, i.e., they maintain an axial separation between snap-in disks 30, 31. As shown in FIGS. 5 through 7 in particular, bearing 29 is retained in a sleeve 32. Sleeve 32 encloses transmission shaft 16. Sleeve 32 is composed of two circumferential sections 32a and 32b, which have different outer diameters. In the drill-only mode, bearing 29 is located axially directly behind tool shaft 22 and bears against sleeve 32.

Figure 3:
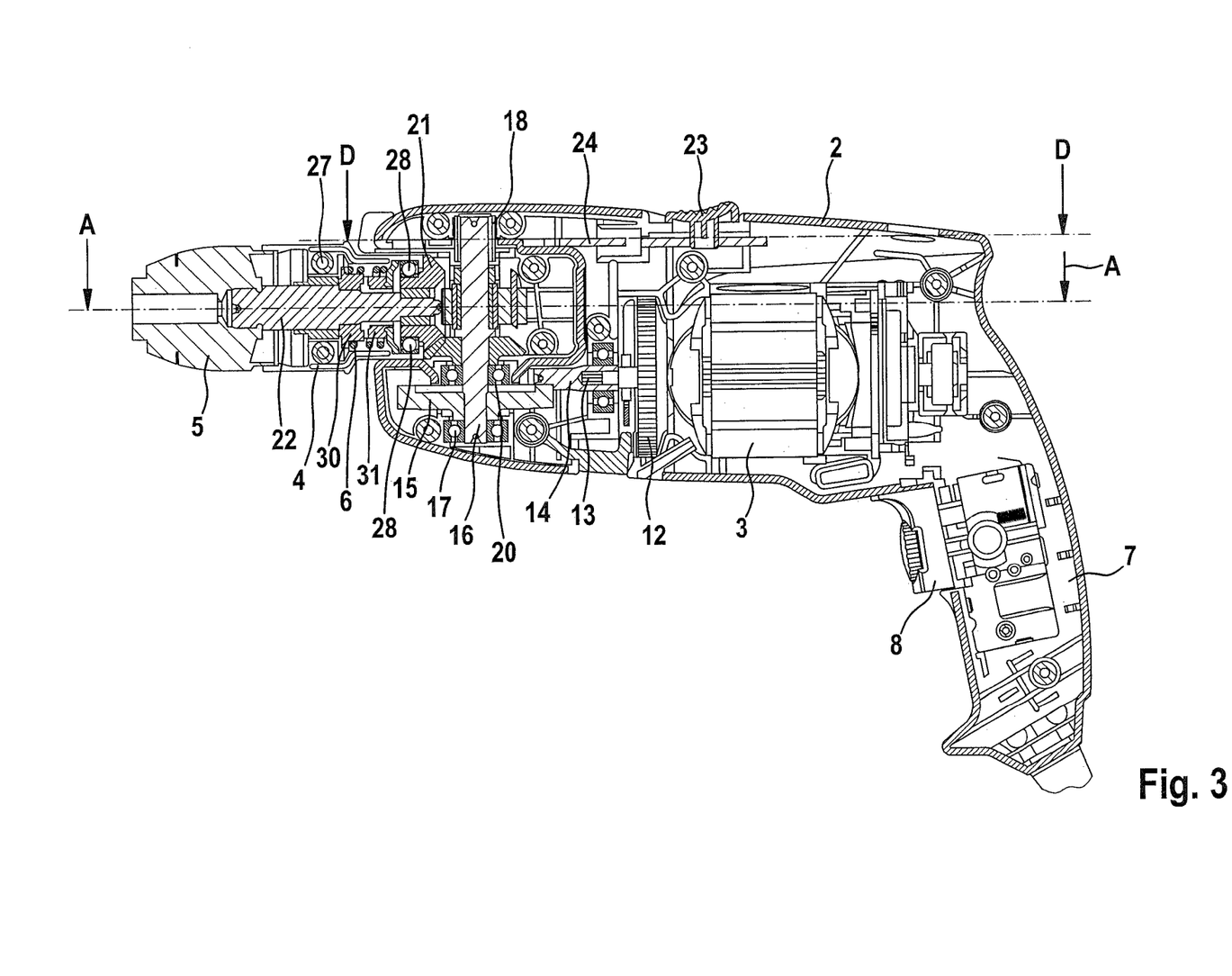
FIG. 3: The impact drill, in a longitudinal sectional view, set for the combination impact-drilling mode.
Figure 4:
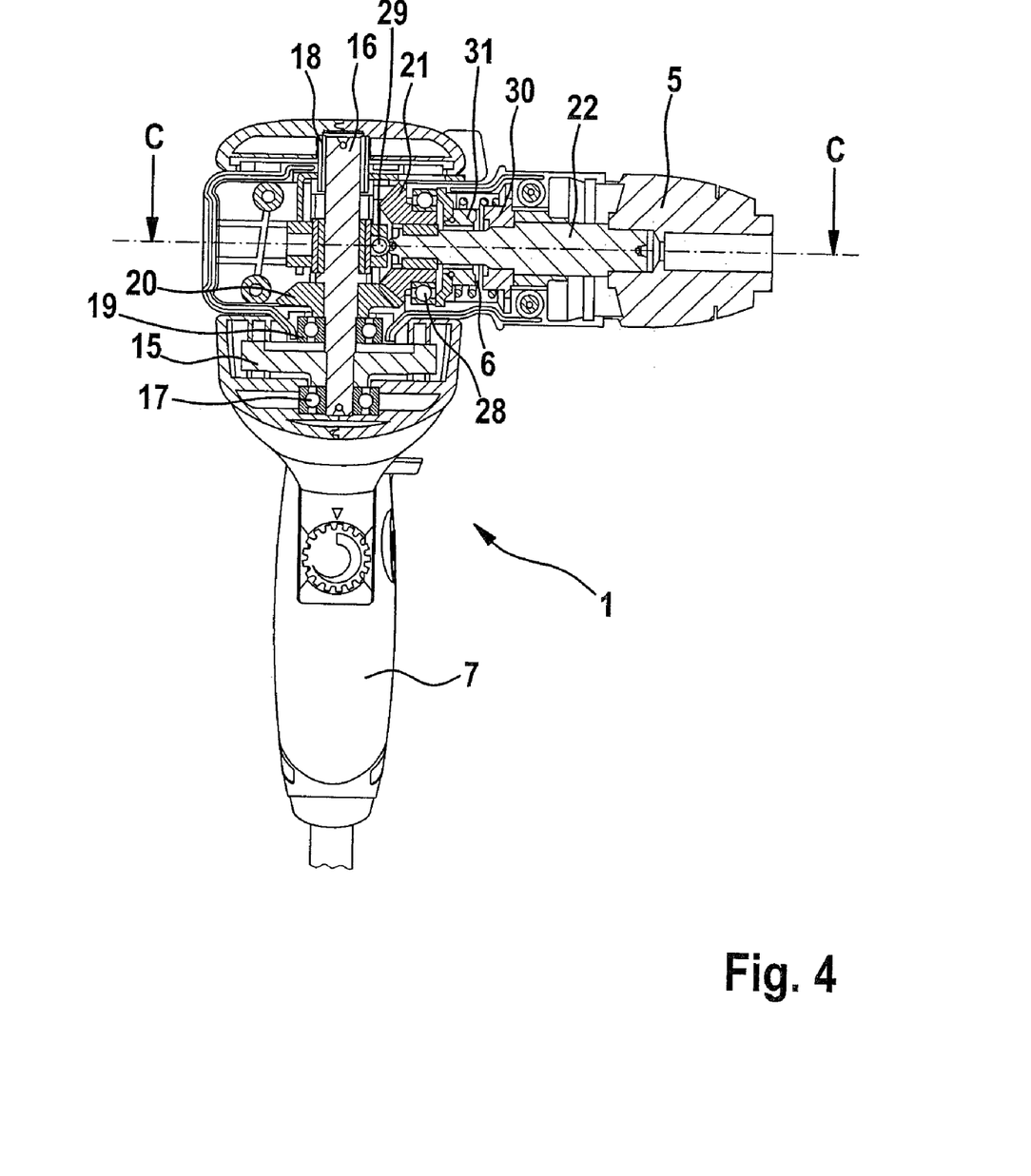
FIG. 4: The impact drill with a swivel device capable of being swiveled by 90°, set for the drill-only mode.

Using a switch 33 shown in FIG. 8, sleeve 32—with bearing 29—may be swiveled in the circumferential direction around transmission shaft 16 into the circumferential position ("park" position) shown in FIGS. 3, 5 and 8, in which a combination impact-drilling mode is possible. In this swiveled circumferential position—which is shown in FIG. 5 in particular—circumferential section 32b with the smaller outer diameter is located axially behind tool shaft 22 at a distance, thereby allowing tool shaft 22 to be displaced rearward in the axial direction.

As shown in FIG. 5 in particular, in the switch setting shown in FIG. 8, front snap-in disk 30—which is non-rotatably mounted on tool shaft 22—comes to rest via its end face with snap-in disk 31, which is fixed in position in swivel device 4. Stationary snap-in disk 31 simultaneously limits the maximum axial deflection of tool shaft 22. The end faces of snap-in disks 30, 31 are designed in a manner known per se, so that a rotational motion of tool shaft 22 results in axial impacts on snap-in disk 30 and, therefore, tool shaft 22 and, therefore, on tool fitting 5.

Second handle 9, which is shown in FIG. 1, serves mainly to apply the contact pressure required to produce sufficiently strong impact impulses onto tool shaft 22 in the impact direction, force thereby being applied to tool shaft 22 with its snap-in disk 30 in the direction of non-rotatable snap-in disk 31. Second handle 9 is an advantage mainly in the position of swivel device 4, which has been swiveled by 90° and is shown in FIG. 5, if the intention is to use a combination impact-drilling mode in this position. To this end, however, bearing 29—which is still engaged with tool shaft 22 in FIG. 4—must be swiveled in the circumferential direction around transmission shaft 16 using switch 33 (FIG. 8), so that snap-in disks 30, 31 come to rest against each other.

It will be understood that each of the elements described above, or two or more together, may also find a useful application in other types of constructions differing from the type described above.

While the invention has been illustrated and described as embodied in an impact drill, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An impact drill, comprising:
    a motor housing;
    a drive motor located in said motor housing;
    a swivel device swiveling around a swivel axis relative to said motor housing and receiving a tool fitting, the drive motor driving the tool fitting through a transmission shaft serving as the swivel axis; and
    an impact mechanism being disposed in the swivel device and having a front snap-in disk and a stationary snap-in disk.

2. An impact drill as defined in claim 1, wherein said swivel device is fixable in position relative to said motor housing in a manner selected from the group consisting of in discrete angular increments and in any angular position.

3. An impact drill as defined in claim 1, wherein the impact drill is configured so that it is switchable between a drilling-only mode and a combination impact-drilling mode, further comprising means for switching the impact drill between the drilling-only mode and the combination impact-drilling mode.

4. An impact drill as defined in claim 1, wherein said axial bearing is displaceable out of its support position into a "park" position.

5. An impact drill as defined in claim 4, wherein said axial bearing is displaceable out of said support position into said "park" position in a circumferential direction.

6. An impact drill as defined in claim 1, wherein said axial bearing is formed by a bearing which is braced in the axial direction against a sleeve that encloses a swivel axis, so that said bearing is displaceable by rotating said sleeve into a "park" position.

7. An impact drill as defined in claim 6, wherein said sleeve has regions with different outer diameters and encloses said swivel axis at least in sections.

8. An impact drill as defined in claim 1, wherein said swivel device is provided with a handle.

\* \* \* \* \*